US006970551B2

(12) United States Patent
Costrell et al.

(10) Patent No.: US 6,970,551 B2
(45) Date of Patent: Nov. 29, 2005

(54) METHOD AND SYSTEM FOR IDENTIFYING CALLS HAVING THE SAME ORIGINATING NUMBER AND DESTINATION NUMBER

(75) Inventors: Daniel Neal Costrell, Colorado Springs, CO (US); Frances Delia Evance Taylor, Falls Church, VA (US)

(73) Assignee: MCI, Inc., Ashburn, VA (US)

( * ) Notice: Subject to any disclaimer, the term of this patent is extended or adjusted under 35 U.S.C. 154(b) by 620 days.

(21) Appl. No.: 10/053,616

(22) Filed: Jan. 24, 2002

(65) Prior Publication Data

US 2003/0138088 A1 Jul. 24, 2003

(51) Int. Cl.[7] ........................... H04M 3/42; H04M 3/00
(52) U.S. Cl. .................... 379/234; 379/207.15
(58) Field of Search .................... 379/207.15, 234, 379/45

(56) References Cited

U.S. PATENT DOCUMENTS

| | | | | |
|---|---|---|---|---|
| 3,789,153 A | * | 1/1974 | Malm | 379/266.06 |
| 4,310,726 A | * | 1/1982 | Asmuth | 379/207.15 |
| 6,289,083 B1 | * | 9/2001 | Ray | 379/49 |
| 6,415,018 B1 | * | 7/2002 | Antonucci et al. | 379/45 |
| 6,556,659 B1 | * | 4/2003 | Bowman-Amuah | 379/9.04 |
| 6,674,849 B1 | * | 1/2004 | Froeberg | 379/201.06 |
| 6,680,998 B1 | * | 1/2004 | Bell et al. | 379/37 |
| 6,711,247 B1 | * | 3/2004 | Needham et al. | 379/207.14 |

* cited by examiner

Primary Examiner—Ahmad F. Matar
Assistant Examiner—Hector Agdeppa

(57) ABSTRACT

A method for uniquely identifying calls having the same originating number and dialed number, and network components adapted to carry out that method. A Parking Manager receives a Park Request that includes the originating number, the dialed number, and a Network Call ID (Identification). The Parking Manager accesses a pool of Dialed Number Identification System (DNIS) override digits associated with the dialed number and returns these digits with the response to the Park Request. The originating number and DNIS override digits uniquely identify the call, and are combined with the destination number, and the combination is flagged as pending in the Parking Manager. The DNIS override digits are received by an Interactive Voice Response (IVR) system that uses a many-to-one mapping to identify the dialed number and complete the call, and returns a call arrival signal to the Parking Manager including a PPID generated by the Voice Response system to Parking Manager. The Parking Manager then maps the PPID to the corresponding Network Call ID so that further signals among various network components can be properly associated with the call. The Parking Manager also clears the flag for the DNIS override digits, originating number, destination number combination so that this combination can be used for another call.

18 Claims, 5 Drawing Sheets

METHOD AND SYSTEM FOR IDENTIFYING CALLS HAVING THE SAME ORIGINATING NUMBER AND DESTINATION NUMBER

FIELD OF THE INVENTION

The present invention relates to call processing in a telecommunications system, and more particularly to identification of calls that are in process concurrently in a network and which share common originating numbers and destination numbers (hereinafter sometimes dialed number, or 8xx).

BACKGROUND OF THE INVENTION

In organizations such as large offices, many stations, e.g. telephone sets, are connected to the public switched telephone network through a Local Exchange Carrier (LEC). A call originating at one of these stations is connected by the LEC to an outside line. For the convenience of outside callers, many such outside lines may share a single number. Other systems, such as Interactive Voice Response systems (IVR's) and Call Routers (hereinafter sometimes, collectively "call response systems") also commonly have a number of outside lines sharing a single number. (IVR's are computers deigned to interact via Dual Tone Multi-Frequency (DTMF) and audio signals with both callers and called parties. Call Routers are a type of routing system that handles, or routes, calls to call centers such as those that handle catalogue sales.) Typically, thought not necessarily, such shared numbers are toll free "8xx" numbers. Many such systems are unable to receive a Network Call ID (identification) (NCID) or out-of-band signals and rely instead on the combination of the Automatic Number Identification (ANI), 8xx, to identify the call.

When a switch in the telephone network receives a call to an 8xx number it sends a routing query to a system comprising network components (i.e. software modules running on one or more network hardware systems) including: a Data Access Point (DAP) a Remote Data Gateway (RDG), a Router, and a Parking Manager (PM); and receives a response containing routing information. When the DAP receives the routing query it consults its database. For calls of the type which are to be processed in accordance with the present invention, the database query informs the DAP to forward the routing query to an RDG, which translates between the messaging protocols used by the DAP and protocols used by other network components. The DAP sends the routing query to a Router, which determines routing for the call in accordance with predetermined routing plans, or strategies, in a known manner. (Those skilled in the art will recognize that, despite the similarity in terminology, Routers and Call Routers are distinct devices, having different functions.) If the Router determines that the call should be parked, it sends a Park Request to a PM. The PM determines if and where the call should be parked in a known manner, and returns this information to the Router, which forwards it to the RDG, which reformats the information and forwards it to the DAP, which reformats the information again and sends it to the switch. As is known, at this point the DAP also performs a one-to-one mapping of the 8xx into a Dialed Number Identification System (DNIS) value and incorporates the DNIS value into the message to the switch. The switch then routes the call as provided in the message.

While this approach has generally proven to be satisfactory, a problem can arise when two or more calls are routed though an LEC and have the same ANI and destination 8xx. If the two such duplicate calls are in process concurrently there is no way to identify communications between the IVR and various network components as relating to one or the other of the calls. Accordingly, there is a need for a method to uniquely identify calls to an IVR, or similar system that cannot receive an NCID or out-of-band signals, where the calls have the same ANI, 8xx, and for network components to support such method.

SUMMARY OF THE INVENTION

These and other needs are addressed by the present invention by a method, and network components, and computer-readable media carrying instructions for controlling the network components to carry out the method. In accordance with one embodiment of the present invention a method for uniquely identifying calls on a switched network, the calls having the same ANI and dialed number, includes: receiving a first request for service for a first call, the first request including a first ANI and a first dialed number for the first call; selecting a first code from a pool of codes corresponding to the first dialed number; returning a first response to the first request, the first response including the first code; receiving a second request for service for a second call, the second request including the first ANI and the first dialed number for the second call; selecting a second code from the pool of codes; and returning a second response to the second request, the second response including the second code. Thus components of the network can uniquely identify the first and second calls when exchanging information in regard to the calls from respective combinations of the first ANI with the first code and with the second code.

In accordance with another aspect of the present invention the method further includes: providing a call response system for further processing of the call, the call response system including a data structure mapping codes in the pool to the first dialed number; controlling the call response system, to receive an ANI and a particular code selected from the pool; controlling the call response system to access the data structure and map the particular code to the first dialed number; and thereafter controlling the call response system to process the call in accordance with the first dialed number.

In accordance with another aspect of the present invention the call response system is an Interactive Voice Response system.

In accordance with another aspect of the present invention the method further includes: determining if the first code is pending; selecting the first code only if it is not pending; and then storing an indication that the first code is pending.

In accordance with another aspect of the present invention the method further includes: receiving a call arrival message for the first call from the call response system; and then clearing the indication that the first code is pending.

In accordance with another aspect of the present invention the service request includes a Network Call ID and the call received message includes a call response system call ID, the method further including mapping said call response system call ID to said Network Call ID.

In accordance with another aspect of the present invention the method further includes: receiving a third request for service for a third call, the third request including a second dialed number for the third call; determining that a pool of codes corresponding to the second dialed number does not exist; returning a third response to the third request, the first response including a base DNIS corresponding to the second dialed number; and c) returning a third response to the third request, the first response including a base DNIS corresponding to the second dialed number.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, network components adapted to such method, and software for controlling such components to carryout such method, are described. In the following description, for the purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid unnecessarily obscuring the present invention.

Figure 1:
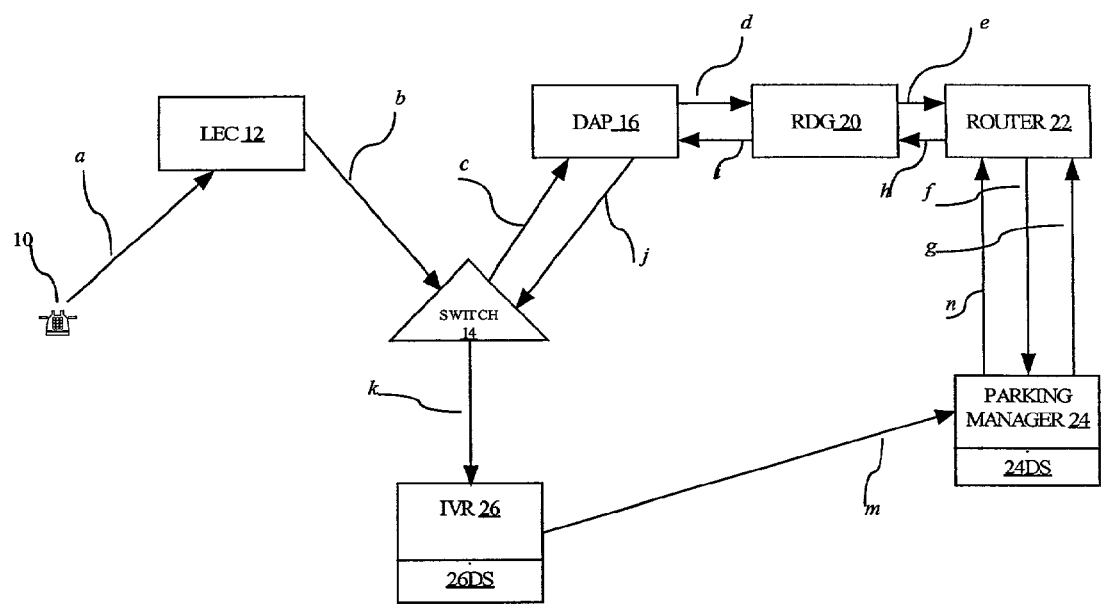
FIG. 1 is a schematic block diagram illustrating network components and the signaling between such components in routing of a call through an LEC to an IVR.

FIG. 1 shows a schematic representation of the completion of call a from station 10 to IVR 26 and the associated signals exchanged among various network components. LEC 12 receives call a. LEC 12 then selects an outside line and sends signal b to switch 14, which serves IVR 26. Signal b includes ANI, 8xx, the originating and dialed number for call a. Since more than one outside line from LEC 12 can share a common ANI and more than one outside line to IVR 26 can share a common 8xx, the ANI, 8xx combination for signal b is not necessarily unique.

Switch 14 then sends signal c to DAP16. Signal c includes ANI, 8xx and an NCID identifying call a. It should be noted that IVR 26 is of the class of device that includes Feature Group D and that NCID's are not passed though Feature Group D.

DAP 16 then sends signal d to RDG 20, which sends signal e to Router 22, and Router 22 sends Park Request f to parking manager 24. Signals d and e, and the Park Request all contain ANI, 8xx, NCID. If Parking Manager 24 decides to park call a, it returns signal g which includes ANI, 8xx, the location of IVR 26, DNIS override digits (as described further below), and NCID to Router 22. If provision is made for duplicate calls to dialed number 8xx, DNIS override digits (hereinafter sometimes DNIS O.D.) are selected by Parking Manager 24 so that the combination ANI, DNIS O.D. uniquely identifies call a and the selected combination is further combined with dialed number 8xx, as will be described further below. This information is then sent in signals h and i though RDG 20 to DAP 16.

In prior systems, where duplicate calls were not a concern, DAP 16 would receive a signal from Parking Manager 24, which would not contain DNIS O. D., and would map the 8xx into a DNIS value and these DNIS values are passed though switch 14 to IVR 26 which uses them to complete processing of the call. In accordance with the present invention DAP 16 uses DNIS O.D. to replace the normal, or base, DNIS, as will be described further below, and sends signal j including ANI, 8xx, the location of IVR 26, DNIS O.D. and NCID to switch 14. When switch 14 receives signal j it identifies call a and locates IVR 26 and sends signal k including ANI, DNIS O.D. to IVR 26. IVR 26 then maps DNIS O.D. back to dialed number 8xx, as will be described further below, and completes processing of call a. IVR 26 then sends signal m including ANI, DNIS O.D., 8xx, together with a call identifier, sometimes referred to as a "Parking Platform ID"_(PPID), provided by IVR 26, to PM 24. PM 24 then establishes a mapping of PPID to NCID and releases the combination ANI, 8xx for further use. Thereafter, further signals from IVR 26 to Parking Manager 24 are identified by PPID and the map can be used to identify related signals n to Router 22 with the corresponding NCID, as will be described further below.

Figure 2:
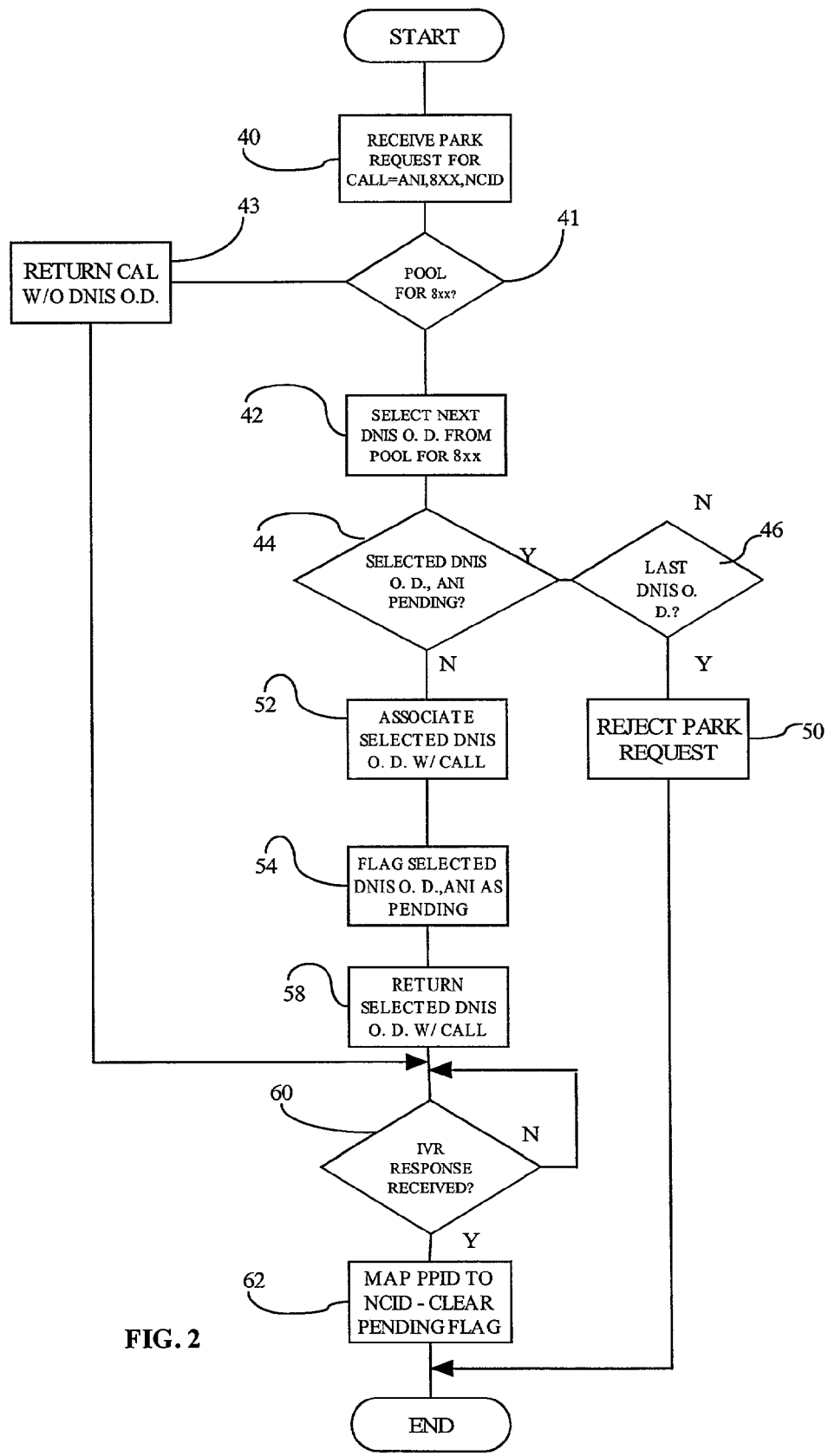
FIG. 2 is a flow diagram showing the operation of the PM of FIG. 1.

FIG. 2 shows a flow diagram of the operation of Parking Manager 24 in processing a Park Request in accordance with the present invention. At step 40, Parking Manager 24 receives a park request from Router 22. The Park Request includes ANI, 8xx, and NCID for the call.

At step 41 PM 24 determines if a pool of DNIS O.D. values exists for the call a 8xx, i.e. if provision is made for duplicate calls to that 8xx, and, if not, at step 43 returns a Park Response without a DNIS O.D. value and thereafter call a is processed in a known manner, as is described further below.

At step 42 Parking Manager 24 selects the next DNIS O.D. value from a pool of values associated with dial number 8xx. The number of values in the pool will be based upon the anticipated traffic for the corresponding 8xx. A mapping of 8xx values to corresponding pools of DNIS O.D. values is maintained in data structure 24DS (shown FIG. 1).

At step 44 PM 24 determines if the selected DNIS O.D., ANI, 8xx combination is pending. That is, it determines if the corresponding call has been parked and if PM 24 is waiting for a call arrival message from IVR 26. If the selected combination is pending, then at step 46 PM 24 determines if this is the last DNIS O.D. value in the pool, and if so rejects the park request at step 50 and exits. If it is not the last value in the pool then PM 24 returns to step 42 to select the next value. When a DNIS O.D., ANI, 8xx combination that is not pending is found then, at step 52, Parking Manager 24 associates the selected DNIS O.D. value with the call. Then at step 54 it flags the selected DNIS O.D., ANI, 8xx combination as pending. Then at step 58 PM 24 returns the selected DNIS O.D. value together with the ANI, 8xx with the Park Request acknowledgment to Router 22.

By flagging the DNIS O.D., ANI, 8xx combination PM 24 allows the DNIS O.D. values to be used to distinguish several calls in process to the same 8xx concurrently, so long as the calls have different ANI values. This allows use of a smaller pool of DNIS O.D. values then would otherwise be the case.

At step 60 PM 24 waits for call a arrival signal m from IVR 26. Call arrival signal m includes the ANI, DNIS O.D., and 8xx for call a together with a PPID identification for call a supplied by IVR 26.

At step 62 PM 24 maps the PPID to the NCID and clears the pending flag for the ANI, 8xx combination. Thereafter, the mapping can be used to ensure that signals from PM 24 to IVR 26 and Router 22 correctly correspond to the call. The ANI, DNIS O.D., 8xx combination can then be used for another call.

Parking Manager 24 then exits. Those skilled in the art will of course recognize that PM 24 can be programmed to carry on the processing of multiple calls concurrently.

Although the DNIS O.D., ANI combination is sufficient to uniquely identify a call, and 8xx is logically redundant (since DNIS O.D. maps uniquely into 8xx); existing Parking Manager/IVR interfaces require all three fields, and the use of all three fields is preferred to simplify migration of software.

Figure 3:
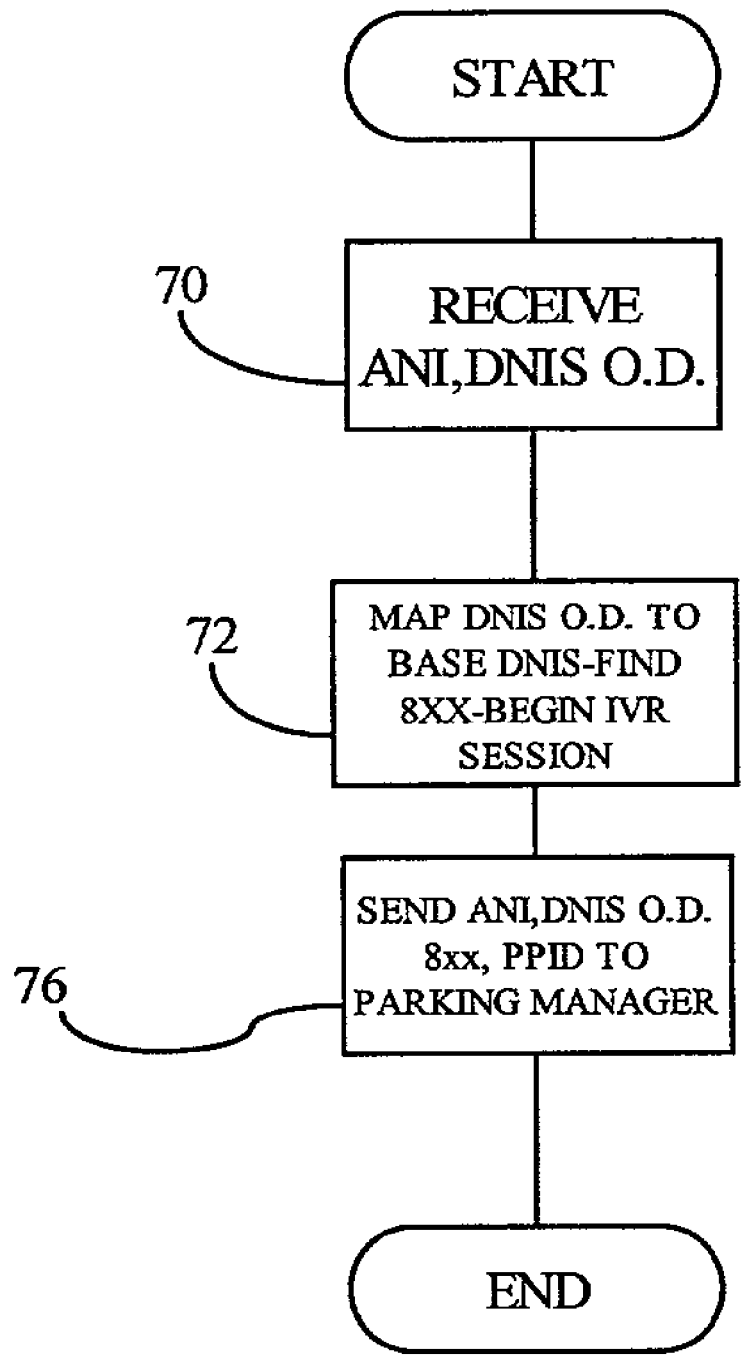
FIG. 3 is a flow diagram showing the operation of the IVR of FIG. 1.

FIG. 3 shows a flow diagram of the operation of IVR 26 in accordance with the present invention. At step 70 IVR 26 receives ANI, DNIS O.D from switch 14. As noted ANI, DNIS O.D. uniquely identifies the call.

At step 72 IVR 26 accesses Data structure 26DS (shown in FIG. 1) to identify the 8xx value. Data structure 26DS is a many-to-one mapping which maps the values of DNIS O.D. to values of 8xx. Preferably, data structure 26DS will map values of DNIS O.D. to the base DNIS and IVR 26 will then determine the 8xx value in a conventional manner. When the 8xx value is identified IVR 26 completes processing of the call and begins the Interactive Voice Response session.

IVR 26 then sends a signal to PM 24, which includes ANI, DNIS O.D. and an identification generated by IVR 26, PPID. PPID is then mapped to NCID to assure that signals among various network components are properly identified.

IVR 26 then exits. Those skilled in the art will also recognize that IVR 26 can be programmed to carry on the processing of multiple calls concurrently.

Figure 4:
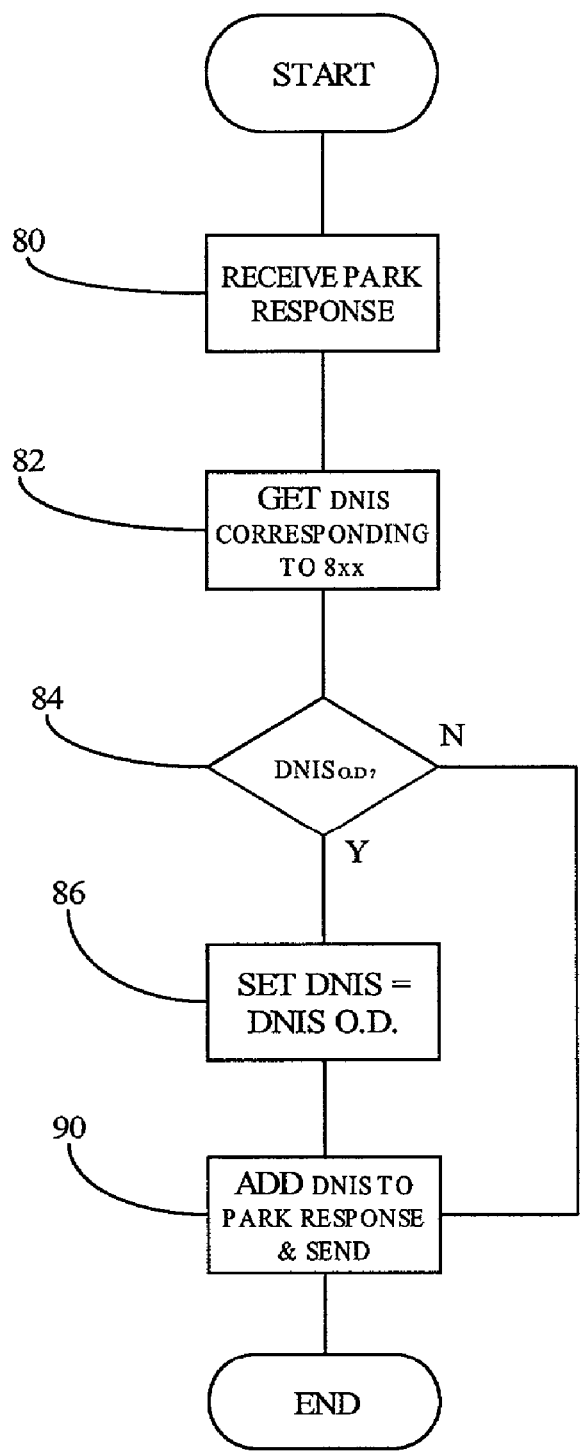
FIG. 4 is a flow diagram of the operation of the DAP of FIG. 1.

FIG. 4 shows the operation of DAP 16 in overriding the base DNIS value in accordance with the present invention. At step 80 DAP 16 receives the Park Response (signal i) and at step 82 determines the base DNIS value corresponding to the 8xx. At step 84 DAP 16 determines if the Park Response includes a DNIS O.D. value and, if not goes to step 90. If a DNIS O.D. is present then at step 86 the base DNIS is replaced by the DNIS O.D. provided by PM 24, as described above. At step 90 the information (DNIS or DNIS O.D.) is added to the Park Response and sent to switch 14 (signal j). Thus where there is no DNIS O.D., i.e. no provision for duplicate calls to an 8xx, IVR 26 receives, and returns to PM 24, the base DNIS from DAP 16 and call a is handled in a conventional manner. Thus, where for an 8xx where no provision is made for duplicate calls, the base DNIS is provided and the call is processed in a known manner.

Figure 5:
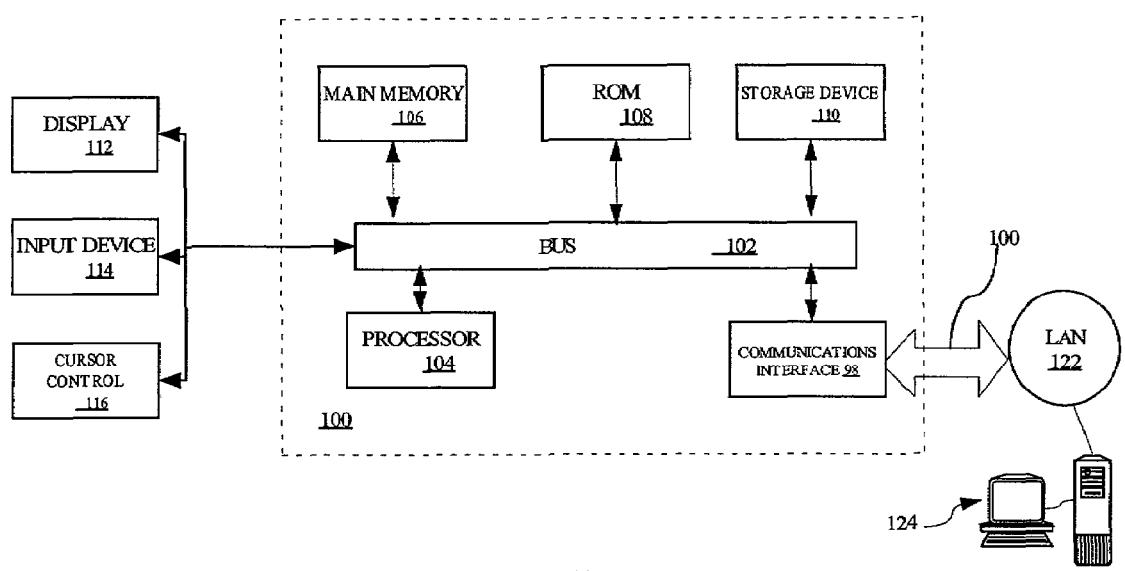
FIG. 5 shows a computer system that can be used to execute various elements of program code to implement functions of the present invention.

FIG. 5 is a block diagram that illustrates a more detailed representation of a general purpose computer system 100. System 100, or similar systems, can be programmed to implement network components such as DAP 16, RDG 20, Router 22 or Parking Manager 24; and can be programmed to provide control functions for IVR 26. Other architectures can also implement such network components, or provide such control functions, and any form of data processing system that can be programmed to carry out the functions described above is within the contemplation of the present invention. In the embodiments shown, data processing system 100 includes bus 102 or other communication mechanism for communicating information, and processor 104 coupled with bus 102 for processing information. Data processing system 100 also includes main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Data processing system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Data processing system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of data processing system 100, or similar systems, for implementing network components such as PM 24 and to provide control functions for IVR 26. According to one embodiment of the invention, these functions are provided by data processing system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to data processing system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Data processing system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices to provide new or updated program code. In other embodiments of the present invention other means for provision of communication services, such as through the worldwide packet data communication network, now commonly referred to as the "Internet" can be used. Local network 122 and the Internet both use electrical, electromagnetic or optical signals that carry digital data streams. The signals through the various networks and the signals on network link 120 and through communication interface 118, which carry the digital data to and from data processing system 100, are exemplary forms of carrier waves transporting the information.

Data processing system 100 can send messages and receive data, including program code, through the network(s), network link 120, and communication interface 118. Data processing system 100 can send messages and receive data, including program code, from host 124 through local network 122, network link 120, and communication interface 118, or in any other convenient manner, such as over the Internet or wireless communication. The received code may be executed by processor 104 s it is received, and/or stored in storage device 110 or other non-volatile storage for later execution. In this manner, data processing system 100 may obtain application code in the form of a carrier wave.

While in the embodiments shown the functions described above have all been carried out by processor 120 in other embodiments one or more functions can be carried out by separate systems communicating through local network 122 or in any other convenient, manner.

Programming of system 100, or of other systems within the contemplation of the present invention, is well within the ability of those skilled in the art, and need not be described further here for an understanding of the present invention.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A call processing system, comprising:
    a switch for receiving a plurality of calls for a plurality of services identified by respective base dialed number;
    a parking manager configured for:
        managing a plurality of concurrent calls from among the calls routed from the switch, said concurrent calls having the same Automatic Number Identification (ANI) and the same base dialed number; and
        communicating respective codes for the concurrent calls to the switch, wherein each of respective codes for the concurrent calls having the same Automatic Number Identification (ANI) and the same base dialed number are different from one another;
    a call response system configured for:
        receiving a request for the service from the switch, said request corresponding to one of the concurrent calls and including a corresponding one of the respective codes and the same Automatic Number Identification (ANI);
        determining the base dialed number from among the respective base dialed numbers based on the corresponding one of the respective codes;
        controlling the parking manager for further management of the one of the concurrent calls based on the corresponding one of the respective codes; and
        initiating further processing of the request for the service in accordance with the base dialed number.

2. A call processing system as described in claim 1, wherein the base dialed number and each of the respective codes have the same number of digits.

3. A call processing system as described in claim 1, wherein the parking manager is further configured for setting an indication that a combination of an Automatic Number Identification (ANI), a base dialed number, and a code for the one of the concurrent calls is pending.

4. A call processing system as described in claim 3, wherein the parking manager is further configured for determining the code for the concurrent call by:
    accessing a pool of codes corresponding to the base dialed name for a concurrent call; and
    selecting the code from the pool only if the combination of the Automatic Number Identification (ANI), the base dialed number, and the code for the concurrent call is not indicated as pending.

5. A call processing system as described in claim 3, wherein:
said controlling the parking manager for further management includes sending a call arrival message including the corresponding one of the respective codes, the same Automatic Number Identification (ANI) and the determined base dialed number; and
the further management of the one of the concurrent calls includes clearing the indication that the combination of the Automatic Number Identification (ANI), the base dialed number, and the code for a concurrent call is pending.

6. A call processing system as described in claim 1, wherein the further management of the one of the concurrent calls includes completing management of the one of the concurrent calls.

7. A call processing system as described in claim 1, wherein:
the plurality of concurrent calls includes a first concurrent call and a second concurrent call;
the first concurrent call is the earliest one of the concurrent calls to be controlled by the call response system for further management;
the second concurrent call is the latest one of the concurrent calls to be routed by the switch; and
the second concurrent call has been routed by the switch before the first concurrent call has been controlled by the call response system for the further management.

8. A method for parking calls for a service identified by a base dialed number, comprising:
managing a plurality of concurrent calls from among the calls received at a network component, said concurrent calls having the same Automatic Number Identification (ANI) and the same base dialed number;
determining respective codes for the concurrent calls, wherein each of respective codes for the concurrent calls having the same Automatic Number Identification (ANI) and the same base dialed number are different from one another;
setting an indication that a combination of an Automatic Number Identification (ANI), a base dialed number, and a code for the one of the concurrent calls is pending and the base dialed number and each of the respective codes have the same number of digits;
communicating the respective codes for the concurrent calls to the network component; and
in response to receiving a call arrival message including the same Automatic Number Identification (ANI), the base dialed number, and the corresponding one of the respective codes, clearing the indication that the combination of the Automatic Number Identification (ANI), the base dialed number, and the code for the one of the concurrent calls is pending.

9. A method for parking calls as described in claim 8, wherein said determining the respective codes includes:
accessing a pool of codes corresponding to the base dialed name for a concurrent call; and
selecting one of the code from the pool only if the combination of an Automatic Number Identification (ANI), the base dialed number, and the one of the codes for the concurrent call is not indicated as pending.

10. A method for parking calls as described in claim 8, wherein:
the plurality of concurrent calls includes a first concurrent call and a second concurrent call;
the first concurrent call is the earliest one of the concurrent calls to be controlled by the call response system for further management;
the second concurrent call is the latest one of the concurrent calls to be routed by the switch; and
the second concurrent call has been routed by the switch before the first concurrent call has been controlled by the call response system for further management.

11. A system for parking calls configured for performing the method as described in claim 8.

12. A computer-readable medium bearing instructions for parking calls, said instructions arranged to cause a processors for performing the method as described in claim 8.

13. A method for processing concurrent calls for a plurality of services identified by respective base dialed numbers, comprising:
receiving a plurality of requests for the service, said requests corresponding to the concurrent calls and including respective codes communicated by a network component, wherein each of respective codes for the concurrent calls having the same Automatic Number Identification (ANI) and the same base dialed number are different from one another;
determining the base dialed number from among the respective base dialed numbers based on the corresponding one of the respective codes for each of the requests received for the service, wherein the base dialed number and the code have the same number of digits;
communicating respective call arrival messages to the network component for controlling further management of the concurrent calls, said call arrival messages including the respective codes; and
initiating further processing of the requests for the service in accordance with the base dialed number.

14. A method for processing concurrent calls as described in claim 13, wherein the call arrival messages further include the same Automatic Number Identification (ANI) and the base dialed number.

15. A method for processing concurrent calls as described in claim 13, wherein the further management of the concurrent calls includes completing management of the concurrent calls.

16. A method for processing concurrent calls as described in claim 13, wherein:
the concurrent calls include a first concurrent call and a second concurrent call;
the first concurrent call is the earliest one of the concurrent calls to be controlled for further management;
the second concurrent call is the latest one of the concurrent calls to be routed to the network component; and
the second concurrent call has been routed to the network component before the first concurrent call has been controlled by the network component for the further management.

17. A system for processing concurrent calls configured for performing the method as described in claim 13.

18. A computer-readable medium bearing instructions for processing concurrent calls, said instructions arranged to cause a processor for performing the method as described in claim 13.

* * * * *